No. 852,583. PATENTED MAY 7, 1907.
N. B. SHORT.
FLOOR SCRAPER.
APPLICATION FILED MAR. 18, 1907.
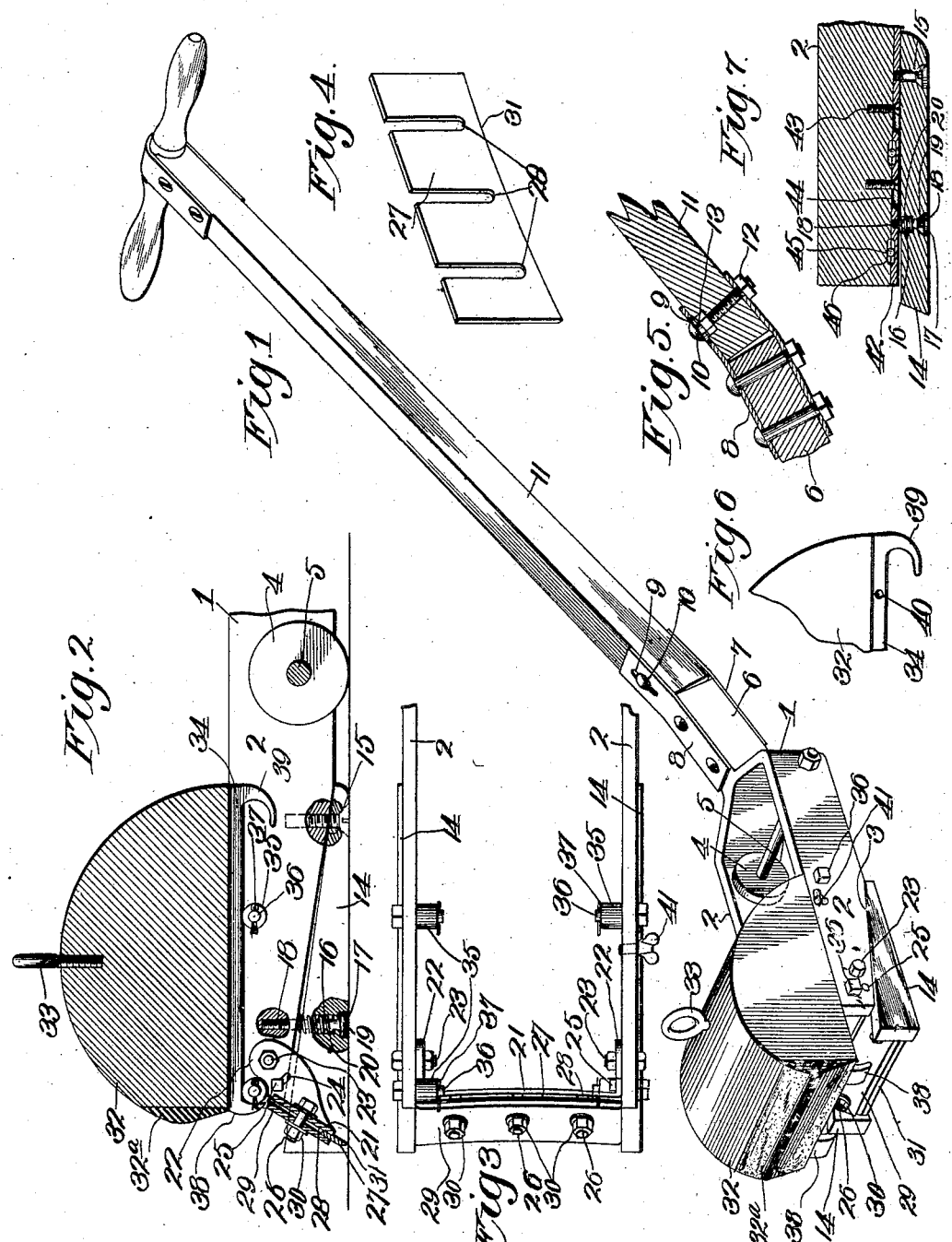
Witnesses:
Frank R. Glore
H. C. Rodgers
Inventor:
Noah B. Short.
By, George H. Thorpe atty.

UNITED STATES PATENT OFFICE.

NOAH B. SHORT, OF KANSAS CITY, MISSOURI.

FLOOR-SCRAPER.

No. 852,583.  Specification of Letters Patent.  Patented May 7, 1907.

Application filed March 18, 1907. Serial No. 362,845.

*To all whom it may concern:*

Be it known that I, NOAH B. SHORT, a citizen of the United States, residing at Kansas City, in the county of Jackson and State of Missouri, have invented certain new and useful Improvements in Floor-Scrapers, of which the following is a specification.

This invention relates to floor scrapers, and my object is to produce a machine of this character which operates efficiently and reliably and which is of simple, strong, durable and cheap construction.

With this general object in view and others as hereinafter appear, the invention consists in certain novel and peculiar features of construction and organization as hereinafter described and claimed; and in order that it may be fully understood reference is to be had to the accompanying drawing, in which—

Figure 1, is a perspective view of a floor scraper embodying my invention. Fig. 2, is an enlarged central vertical section of a portion of the same with parts in the background broken away. Fig. 3, is a top plan view of part of the machine. Fig. 4, is a perspective view of the scraper blade. Fig. 5, is a central vertical section showing the connection between the handle and the shank or stem of the frame. Fig. 6, is a side view of the rear end of the weight, and Fig. 7, a central vertical section of a modified construction.

In the said drawings, 1 indicates a frame of substantially Y shape in plan view and 2 the arms thereof preferably beveled upwardly and forwardly at their lower ends as shown at 3.

4 indicates rollers supporting the rear portion of the frame and mounted on a transverse shaft 5 journaled in arms 2.

6 indicates the stem or shank of the frame and 7 and 8 a pair of spring plates secured rigidly to the lower and upper sides of the stem and projecting beyond the rear end of the same, the spring plate 8 having a longitudinal slot 9, through which extends the stove bolt 10, said bolt also extending through handle 11 and spring plate 7, a clamping nut 12 engaging the lower end of the bolt and a nut 13 engaging said bolt below spring 8 and fitting in a recess in the handle. By this arrangement the spring plate 8 may have a slight longitudinal sliding movement independent of the handle and thus absorb the vibrations incident to the operation of the machine over a rough floor, such vibrations being more pronounced when the machine is operated over the floor transversely of the flooring boards. By this arrangement the operator can handle the machine with less trouble and with greater ease and convenience.

14 indicates a pair of wedge-shaped runners underlying the beveled edges of the frame and projecting forwardly beyond the latter and 15 indicates screw bolts connecting said runners with the frame but not so rigidly as to prevent said frame having a slight up and down movement with respect to the runners.

16 indicates vertical passages in the runners having enlargements 17 at their lower ends and 18 indicates screw bolts extending up through said passages and into the frame with their heads 19 occupying the enlargements 17, expansive coil springs 20 fitting upon said bolts and bearing at their lower ends upon the runners and at their upper ends against the lower edges of the arms of the frame for the purpose of holding the latter yieldingly above the runners.

21 indicates a plate which is preferably concaved at its front side as shown in Fig. 3, and 22 are arms projecting rearwardly from the ends of said plate and fitting against the inner sides of the runners and arms 2 of the frame and pivoted to the latter as at 23, said arms 22 having short slots 24 arranged concentrically of the pivot bolts 23 and receiving clamping bolts 25 carried by arms 2, said bolts being adapted to clamp the plate 21 in the desired position.

26 indicates bolts extending forwardly through plate 21 and through slots 28 of the spring steel scraper blade 27 fitting flatly against the front side of plate 21 and sloping downwardly and rearwardly at a corresponding angle.

29 indicates a curved cap to fit against the front side of the scraper blade and 30 nuts to engage the threaded ends of bolts 26, the screwing home of the nuts 30 clamping the curved cap 29 with sufficient pressure against the blade 27 to cause the latter to assume a curvature corresponding to the curvature of plate 21 and the cap 29, and hence to cause the concaved lower edge 31 of the blade to assume a horizontal plane, the bending of the blade stiffening it so as to avoid vibration as it is drawn across the floor, which vibrations would produce a wave like surface in the floor.

For the purpose of holding the scraper down to its work a weight 32 rests upon the frame and is arranged to slide back so as to permit the blade to be brought into engagement with the floor at the edge of the base board or molding strip, and then slid forward in order to impose the weight more directly over the blade for the purpose of securing an efficient scraping operation. The weight is provided with a handle 33 for convenience in lifting it on or off the machine and with a pair of depending parallel ribs 34 to rest on rollers 35 mounted on the inner ends of pins 36 secured in the arms 2 of the frame, spring cotters 37 or equivalent devices holding the rollers reliably on the pins. The ribs 34 prevent lateral movement of the weight on the frame and to limit the reciprocatory or sliding movement in a rearward direction, the ribs are provided at their front ends with depending lugs 38, to come into engagement with the front rollers 35, one of which is shown in dotted lines in Fig. 3 to leave exposed the head of a bolt below. To limit forward sliding movement of the weight and also to prevent the latter tipping up at its rear end when said limit of movement has been attained, the ribs 34 are provided with depending hooks 39 to embrace the rear and under sides of the other pair of rollers 35 as will be readily understood by reference to Fig. 2, and the front end of the weight is provided with a cushion 32$^a$ to prevent marring of woodwork or walls with which it may come in contact under the forward movement of the weight. Where large surfaces are to be scraped it will be found desirable at times to lock the weight in its advanced position and to accomplish this purpose one of the ribs is provided with a socket 40 to receive the inner end of a set screw 41 mounted in one of the arms 2 of the wheeled frame.

In Fig. 7, I show a modification in which the runners are adapted to have a slight sliding movement without interfering with the slight independent up and down movement of the wheeled frame. To accomplish this object the runners 14 are secured to a plate 42 in the same manner and by similar and correspondingly numbered means employed to secure the runners, in Figs. 1 to 3 inclusive, to frame 2. This plate 42 is secured by screw bolts 43 to arms 2 of the wheeled frame and is provided with longitudinal slots 44 through which said screw bolts extend.

To eliminate friction as far as practicable so that the plate shall slide easily with respect to said frame, balls or rollers 45 occupy channels 46 formed in the opposing faces of said frame and side plate.

In practice it is necessary that the runners if incapable of a longitudinal sliding action, must project slightly forward of the scraper blade and consequently will prevent a floor being scraped to the edge of the baseboard or molding, this projection of the runners being necessary as otherwise when the machine is pulled rearwardly across the floor the weight will slide forwardly and impose a heavy downward pressure over the blade and cause the latter to cut into the floor deeper than desirable, particularly if the front ends of the runners have become rounded slightly through wear, it being understood of course that where the lower front ends of the runners are in transverse alinement with the blade, the forward movement of the weight will tend to tip the front end of the runners downward and thus cause the blade to dig into the floor deeper than is desirable. With the runners projecting beyond the blades, tilting action of the frame caused by the forward movement of the weight will rather tend to lift said blade and thus avoid embedding it to an undesirable depth into the floor. It will thus be seen that as the machine is drawn across the floor and the weight slides forward, that springs 20 will yield so as to permit the blade to firmly grip the floor for the purpose of scraping and finishing its surface. When the machine has been drawn across the floor the operator presses downward on the handle so as to tilt the front end of the machine upward on wheels or rollers 4, which action causes the weight to slide back from the position shown in Fig. 1 to the position shown in Fig. 2. With the parts in this position the machine is again manipulated as before.

The construction shown in Fig. 7 permits the machine to be run up to the baseboard or molding until the runners are arrested by the same, the forward movement also continuing until the blade is in transverse alinement with the front ends of the runners and then is ready to start the scraping operation in the vertical plane of the baseboard or of the inner edge of the molding strip. As the machine starts forward the friction of the runners on the floor so much exceeds that between the slide plates and the frame that the latter may slide rearwardly until said blade is disposed a slight distance rearward of the front ends of the runners, the runners remaining stationary until the blade attains the position described, when as will be readily understood the parts occupy the relation shown in Fig. 2 and the runners projecting forward beyond the blade are adapted in the event of a downward tilting tendency of the blade to prevent the latter from digging into the floor a greater distance than it should. With this modified construction therefore it will be apparent that the entire surface of the floor can be properly scraped with the machine, whereas with the construction shown in Figs. 1 to 3 inclusive a narrow surface extending entirely around the room would be unscraped and would have to be afterward scraped by hand or otherwise.

As greater weight or ballast for the machine is required to maintain a steady unchecked movement of the scraper blade than that required to simply embed said blade to the proper depth in the floor, it will be readily seen that the yieldingly depressed runners are necessary for the purpose of relieving the blade of the excess weight and at the same time preventing a rocking or vibratory movement of the blade which would otherwise be caused by the great resisting strain offered by the floor to the travel of the blade. The blade is made adjustable to operate at varying angles to the plane of the floor in order to adapt the machine to practical use on floors of different degrees of toughness or hardness it being necessary when operating on quarter-sawed flooring for instance, to dispose the blade nearer a vertical plane than when operating on softer flooring as the tendency of the blade to vibrate is less the nearer to the vertical it is disposed.

From the above description it will be apparent that I have produced a floor scraper possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent is:—

1. In a machine of the character described, a frame provided with a handle, a transverse scraping blade carried by the frame, and a longitudinally slidable weight mounted on the frame and adapted as the operator starts to draw the machine over the floor to slide forward and impose most of its weight upon said blade.

2. In a machine of the character described, a frame provided with a handle, a transverse scraping blade carried by the frame, a longitudinally slidable weight mounted on the frame and adapted as the operator starts to draw the machine over the floor to slide forward and impose most of its weight upon said blade, and means to secure said weight rigidly in its last-named position.

3. In a machine of the character described, a frame provided with a handle, a transverse scraping blade carried by the frame, a longitudinally slidable weight mounted on the frame and adapted as the operator starts to draw the machine over the floor to slide forward and impose most of its weight upon said blade, and means to limit the sliding movement of the weight in both directions.

4. In a machine of the character described, a frame provided with a handle, a transverse scraping blade carried by the frame, a longitudinally slidable weight mounted on the frame and adapted as the operator starts to draw the machine over the floor to slide forward and impose most of its weight upon said blade, means to limit the rearward sliding movement of the weight, and means to limit the forward sliding movement of the weight and also prevent the latter from tilting upward at its rear end when at its said forward limit of movement.

5. In a machine of the character described, a frame provided with a handle at its rear end and with runners forward of the handle and a transverse scraper blade at its front end, and a longitudinally slidable weight mounted on the frame and adapted as the operator starts to draw the machine over the floor to slide forward and impose most of its weight upon said blade.

6. In a machine of the character described, a frame provided with a handle at its rear end, and with runners forward of the handle and a transverse scraper blade at its front end, a longitudinally slidable weight mounted on the frame and adapted as the operator starts to draw the machine over the floor to slide forward and impose most of its weight upon said blade, means to limit the rearward movement of the weight, and means to limit its forward sliding movement.

7. In a machine of the character described, a frame provided with a handle at its rear end, runners underlying said frame, springs pressing upwardly against the frame and downwardly on the runners, and a transverse scraping blade carried by the frame at its front end.

8. In a machine of the character described, a frame provided with a handle at its rear end, runners underlying the frame, springs pressing upwardly against the frame and downwardly on the runners a transverse scraping blade carried by the frame at its front end, and a longitudinally slidable weight mounted on the frame and adapted as the operator starts to draw the machine over the floor to slide forward and impose most of its weight upon said blade.

9. In a machine of the character described, a frame provided with a handle at its rear end, runners underlying said frame and projecting forwardly beyond the same, springs pressing upwardly against the frame and downwardly on the runners, a transverse scraping blade carried by the frame at its front end and arranged between and rearward of the front ends of the runners, and a longitudinally slidable weight mounted on the frame and adapted as the operator starts to draw the machine over the floor to slide forward and impose most of its weight upon said blade.

10. In a machine of the character described, a frame provided with a handle at its rear end and a transverse scraper blade at its front end, plates underlying and slidably secured to the frame, runners underlying said plates and capable of a slight up and down movement with respect to said plates, and means for pressing the runners yieldingly down and the plates yieldingly upward.

11. In a machine of the character described, a frame provided with a handle at its rear end and a transverse scraper blade at its front end, plates underlying and slidably secured to the frame, runners underlying said plates and capable of a slight up and down movement with respect to said plates, means for pressing the runners yieldingly down and the plates yieldingly upward, and a longitudinally slidable weight mounted on the frame and adapted as the operator starts to draw the machine over the floor to slide forward and impose most of its weight upon said blade.

In testimony whereof I affix my signature, in the presence of two witnesses.

NOAH B. SHORT.

Witnesses:
  H. C. RODGERS,
  G. Y. THORPE.